Nov. 11, 1924.                      J. M. KOMBOL                      1,515,217
                               AGRICULTURAL IMPLEMENT
                                 Filed June 15, 1921
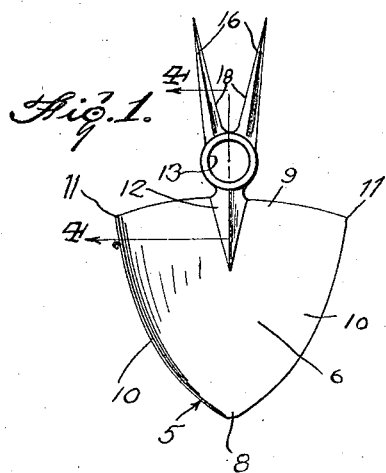
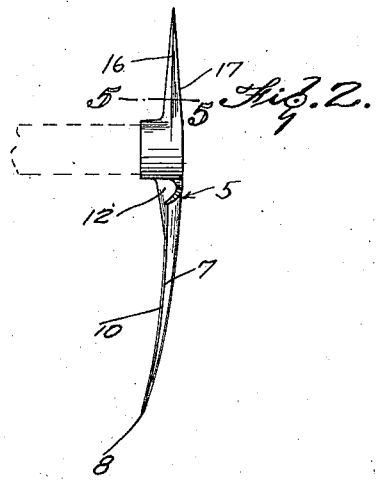
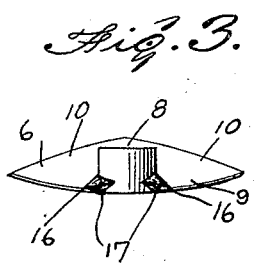
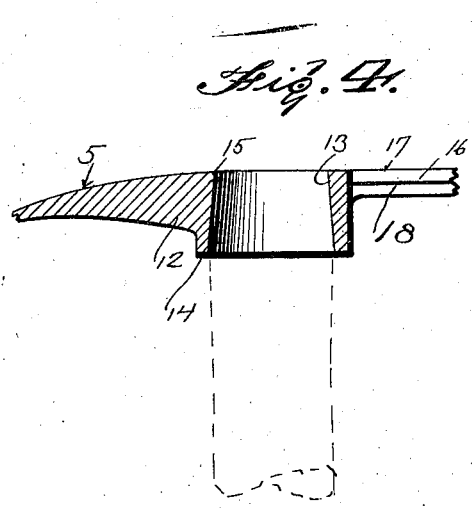
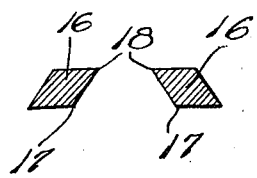
Inventor
Joseph M. Kombol
By Watson E. Coleman  Attorney Patented Nov. 11, 1924.

1,515,217

UNITED STATES PATENT OFFICE.

JOSEPH M. KOMBOL, OF MORAN, IOWA.

AGRICULTURAL IMPLEMENT.

Application filed June 15, 1921. Serial No. 477,731.

*To all whom it may concern:*

Be it known that I, JOSEPH M. KOMBOL, a citizen of the United States, residing at Moran, in the county of Dallas and State of Iowa, have invented certain new and useful Improvements in Agricultural Implements, of which the following is a specification, reference being had to the accompanying drawings.

This invention relates to agricultural implements, and particularly to a hoe for agricultural purposes.

It is an object of the invention to provide an implement of this character capable of being used for hoeing, digging, or harrowing, regardless of the hardness of the ground.

It is another object of the invention to provide a hoe of this character wherein the hoe blade is provided with an extension which projects from the rear edge of the blade, said extension having an eye for the reception of a handle of any form, whereby the end of the handle may be disposed substantially flush with one surface of the hoe blade.

It is another object of the invention to provide an implement of this character wherein the extension of the hoe blade is also provided with extensions in the form of teeth, which project in the opposite direction to that of the blade and have one of their edges disposed substantially flush with one end face of the extension, which permits the implement to be used for tamping ground around plants, etc.

It is also an object of the invention to provide an implement of this character wherein the entire device is cast in one piece without requiring the formation of a handle eye in the blade of the hoe.

With these and other objects in view, the invention consists in the improved construction and arrangement of parts to be hereinafter more particularly described, fully claimed and illustrated in the accompanying drawings, in which:—

Figure 1 is a view in elevation of an agricultural implement constructed in accordance with an embodiment of the invention, Figure 2 is a side elevation of the structure shown in Figure 1, Figure 3 is an end elevation of the structure shown in Figure 1, and Figure 4 is a section taken on the line 4—4 of Figure 1.

Figure 5 is an enlarged section on the line 5—5 of Figure 2.

Referring to the drawings, 5 designates a trowel-like hoe blade, substantially triangular in form, and having a concave face 6 and a convex face 7. This form of blade permits the device to be used for digging, as the apex portion 8 of the blade provides a tooth capable of easily penetrating the ground. In addition to this, the rear portion 9 of the blade is relatively broad so that the blade is capable of carrying a quantity of dirt when the same is used for hoeing. It will be noted that the side portions 10 of the blade gradually incline from the rear portion 9 of the blade to the apex portion 8, the distance between the ends 11 of the blade and the apex portion 8, being substantially the same as the length of the rear portion 9 of the blade. In view of this, either one of the sides 10 may be disposed in engagement with the ground to provide a relatively wide surface for hoeing.

Formed integral with the blade 5, and extending above the concave surface 6, is an extension or neck 12, said extension gradually inclining upwardly, outwardly and beyond the edge of the rear portion 9, the portion projecting beyond said edge being enlarged and provided with an eye or sleeve-like socket 13 for the reception of a handle. By gradually extending the extension 12 from the blade, the eye can be made relatively large and properly reinforced by the gradually extending portion of the extension. In addition to this, it permits the eye to be disposed substantially in spaced relation to the rear edge of the blade, so that the eye or handle does not at any time interfere with the quantity of dirt that may come in contact with the blade. Furthermore, it also eliminates the necessity of forming an eye in the blade and permits any form of stick to be used as a handle, the inner wall of the opening or eye 13 being inclined from the lower edge 14 of the extension to the upper edge 15 so as to firmly bind the handle within the eye without requiring special fastening means for the handle. It will also be noted that the extension 12 is disposed substantially in alignment with the apex portion 8 of the blade so that the direct force of the blow in the digging operation is transmitted to the apex portion 8 and as the handle is disposed in spaced relation to the rear edge of the blade, the force of the blow is not destroyed or interfered with, as would be the case if the handle were extended from or passed through a portion of the blade inwardly of the rear edge thereof.

Projecting beyond the upper end portion 15 of the eye member, of the extension, and formed integral with said eye member, is a pair of teeth 16, said teeth extending in a direction opposite to that of the blade, and in divergent relation to each other, the teeth being spaced from each other at their base so as to permit unobstructed passage of earth between the teeth. Each tooth is substantially diamond-shaped in cross section, the upper longitudinal edges 17 of each tooth being disposed substantially flush with the top face or end of the eye member 13, while the inner longitudinal edges 18 of each tooth are disposed substantially in confronting relation. By this arrangement, the edges of the teeth are arranged so that the face of each tooth, that is the portion between the edges, is disposed on an incline with respect to the blade. The teeth 16 have no direct connection with the blade, so that when in use, any force transmitted to the teeth through the handle, does not affect the blade, as the handle is disposed between the blade and the teeth so that in case the teeth come in contact with a bowlder or like hard substance, there is no danger of damage being inflicted upon the blade.

From the foregoing it will be readily seen that this invention provides a novel agricultural implement, the utility of which is unlimited. It may be used for digging, as it is cast in one piece, and there is no danger of the parts breaking. It may also be used for hoeing in the same position, that is, with the handle disposed above the apex portion 8 of the blade. If it is desired to use a relatively broad edge in the hoeing operation, the implement may be turned so as to place the handle on one side and bring one of the sides 10 in contact with the ground. It may also be used for tamping by disposing the handle in a vertical position. The teeth 16 may be used for various purposes.

What is claimed is:

In an agricultural implement, a sleeve-like handle socket, a pair of pointed teeth projecting from the handle socket in outwardly diverging relation to each other and separately merging with the socket at spaced points, said teeth being of substantially diamond shape in cross section from end to end to provide inside, outside, front and rear straight cutting edges from end to end of each tooth, the inside cutting edges of the teeth being opposed.

In testimony whereof I hereunto affix my signature.

JOSEPH M. KOMBOL.